Nov. 10, 1936.   H. M. ROCKWELL   2,060,691
POWER TRANSMISSION CLUTCH AND HYDRAULIC CONTROL MEANS THEREFOR
Original Filed March 26, 1928   2 Sheets-Sheet 1
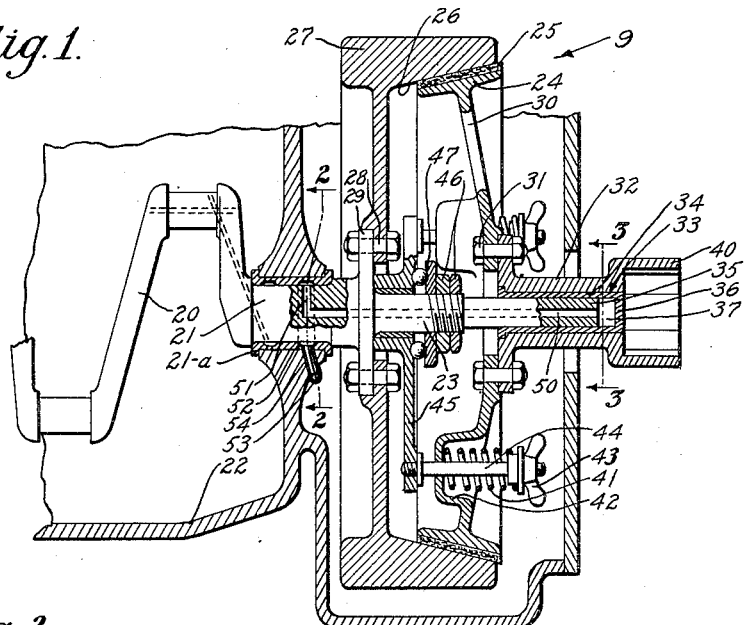
Fig.1.
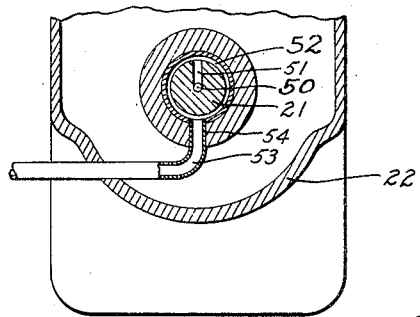
Fig.2.
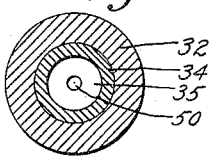
Fig.3.
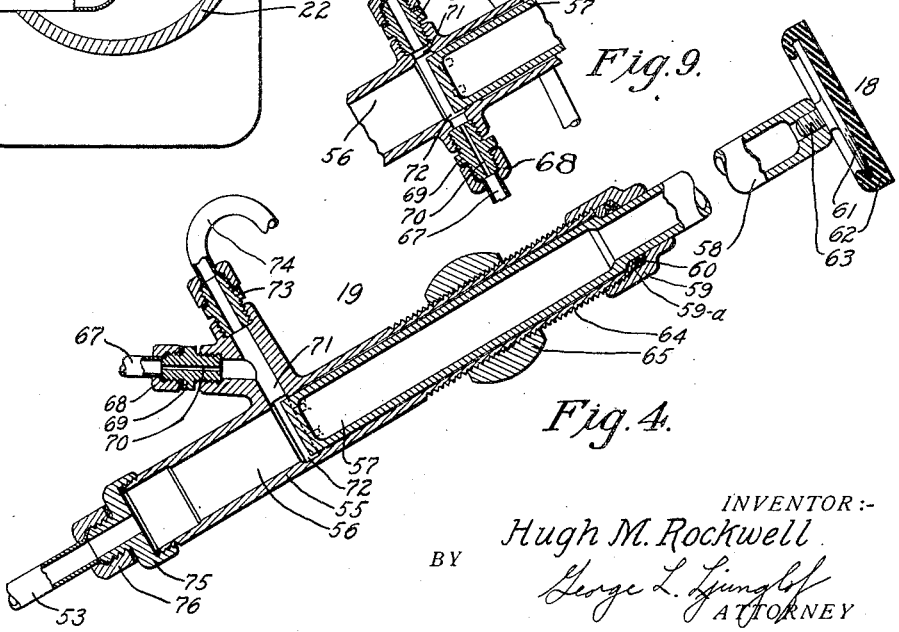
Fig.9.
Fig.4.
INVENTOR:-
Hugh M. Rockwell
BY George L. Ljungloff
ATTORNEY Nov. 10, 1936.   H. M. ROCKWELL   2,060,691
POWER TRANSMISSION CLUTCH AND HYDRAULIC CONTROL MEANS THEREFOR
Original Filed March 26, 1928   2 Sheets-Sheet 2
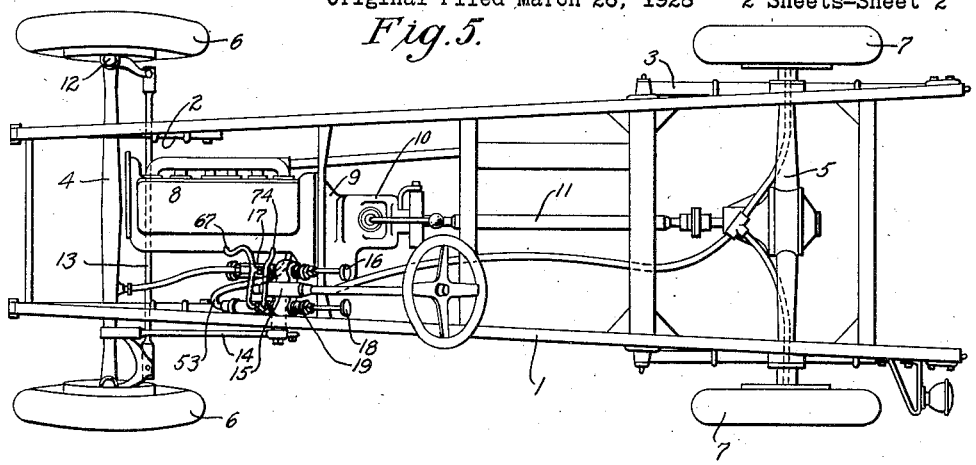
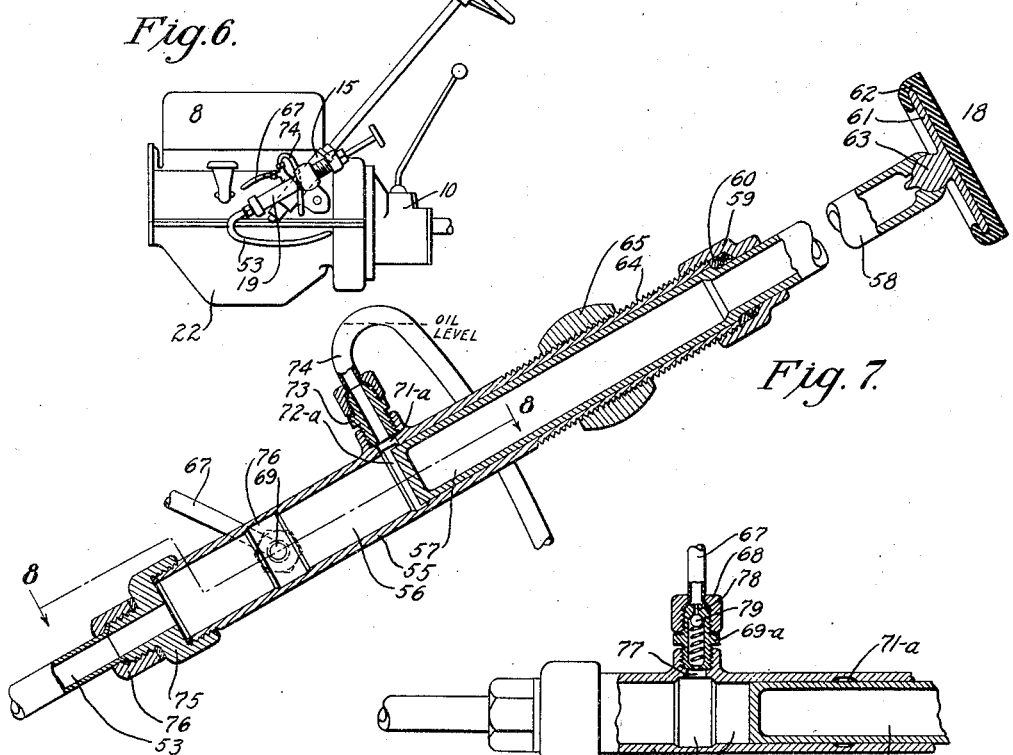
INVENTOR
Hugh M. Rockwell
BY George L. Ljungloff
ATTORNEY Patented Nov. 10, 1936

2,060,691

UNITED STATES PATENT OFFICE 2,060,691

POWER TRANSMISSION CLUTCH AND HYDRAULIC CONTROL MEANS THEREFOR

Hugh M. Rockwell, Freeport, N. Y.

Refiled for application Serial No. 264,765, March 26, 1928. This application May 2, 1932, Serial No. 608,838

19 Claims. (Cl. 192—91)

This invention relates generally to improvements in power transmission clutches, and has particular reference to clutches and actuating means therefor especially adapted for use in motor vehicles.

Clutches, for example those usually employed in the automotive art, each comprise a clutch member secured to the engine shaft for rotation therewith in a fixed plane, and a co-operating clutch member secured to a power transmission shaft and adapted for axial movement whereby to be selectively moved into and out of engagement with the first-mentioned clutch member. Usually, the axially movable clutch member is spring-pressed to its engaging position, and in order to effect disengagement, said movable clutch member, as used heretofore, has been provided with a circumferentially grooved collar or hub which is constantly engaged by a rockable yoke. The yoke is rocked by depression of a foot pedal or lever with which the yoke is connected by suitable links and the like. Due to their inaccessibility, the clutch collars and yokes have been difficult to lubricate, often being entirely neglected, and hence have been subject to rapid wear, necessitating adjustments and replacement of parts.

In some instances anti-friction bearings have been employed in order to overcome these lubrication difficulties, but such bearings have been objectionable because they are noisy in operation.

The foregoing and other objectionable features of the prior art are overcome by the present invention, which has as one of its important objects, to provide a clutch with fluid pressure actuating means, whereby to reduce wear to a minimum.

Another object is to provide such a device which will be hydraulically actuated, with oil as the pressure fluid, and wherein noise and the necessity for frequent manual lubrication are eliminated.

Another object of the invention is to provide an improved master cylinder for hydraulic systems of vehicles, wherein hydraulic pressure is generated by the application of human energy.

Another object of the invention is to provide a clutch and clutch actuating means of extremely simple construction, which will be durable in service, efficient in operation and a substantial advance in the art.

More specifically, the invention contemplates the provision of a clutch wherein the relatively movable clutch members are respectively provided with a cylinder and cooperating piston so disposed that when a suitable fluid, such as oil under pressure, is supplied to the interior of the cylinder, the clutch members will be disengaged. The fluid is supplied from a master cylinder wherein pressure is generated by depression of a foot pedal, but the invention is not necessarily limited to any particular form of master cylinder.

The invention will be readily understood from the following description in connection with the accompanying drawings, wherein one embodiment is shown by way of illustration.

Figure 1 is a vertical, longitudinal, sectional view through one form of clutch embodying the invention;

Figure 2 is a fragmentary, transverse, sectional view on line II—II of Figure 1;

Fig. 3 is a similar transverse sectional view on line III—III of Fig. 1;

Fig. 4 is a vertical, longitudinal, sectional view through the improved master cylinder used for manually controlling the clutch;

Fig. 5 is a diagrammatic plan view of a motor vehicle chassis with my improved hydraulic clutch and braking system;

Fig. 6 is a fragmentary side elevation showing the relationship between the clutch-actuating master cylinder and the steering gear and engine;

Fig. 7 is a vertical, longitudinal, sectional view through a modified form of master cylinder;

Fig. 8 is a fragmentary, sectional view on line 8—8 of Fig. 7, and

Fig. 9 is a fragmentary, sectional view through another modified form of master cylinder.

The invention is applicable to various types of vehicles and has been shown in Fig. 5 in association with an automobile chassis, which includes a chassis frame 1 resiliently supported by springs 2 and 3 on front and rear axles 4 and 5, respectively, the front axle 4 having the usual steerable road wheels 6, and the rear axle 5 having the driving wheels 7. Power is supplied to the rear wheels 7 from a motor 8, through a friction clutch 9, change-speed transmission 10, and propeller shaft 11 to the internal mechanism of the rear axle 5. The front wheels 6 are rotatable on steering knuckles of any ordinary or preferred form, said steering knuckles being adjustable about the axes of king pins 12 at the end of the front axle 4, and the steering being accomplished by links 13 and 14, operable by a steering gear 15. When a foot pedal 16 in association with a master cylinder 17 is employed for actuating a hydraulic brake system, as disclosed in my application Serial No. 195,107, it is desirable similarly to control the clutch 9.

By referring particularly to Figs. 1, 2, and 3, it will be seen that the clutch 9 has been illustrated as a conventional cone clutch, but it is to be understood that it is equally well adapted for use with either a single or multiple disc clutch, jaw clutch, or other forms as desired. In the illustrated embodiment, the crankshaft 20 of the engine 8 is journaled at 21 in the crankcase 22, and has a rearwardly extending portion 23 which constitutes a support for an axially movable clutch element 24. Said clutch element 24 is in the nature of a truncated cone having its periphery lined with leather 25 or other suitable friction material, adapted to engage a correspondingly shaped recess 26 in the engine flywheel 27, which is bolted as at 28 to a flange 29 on the crankshaft 20. The web portion 30 of the clutch element 24 has secured to it, as by bolts 31, a central sleeve or hub 32 which is longitudinally bored at 33 and fitted with a cylindrical liner 34, the interior of which is preferably reamed to receive the accurately machined extremity 35 of the crankshaft extension 23. Said sleeve 32, liner 34, and associated parts are movable longitudinally and rotatably as a unit with reference to the crankshaft, and the cylindrical liner 34 has its rear end closed as at 36, whereby to define a fluid chamber 37 into which a suitable fluid, such as oil, under pressure, may be introduced to effect or control the longitudinal movements of the clutch member 24. From this it will be evident that the reduced extremity 35 of the crankshaft constitutes in effect a piston which is operable in the cylinder 34, although said piston is held against axial movement while the cylinder is capable of such movement upon the piston. In actuation of the device, as will presently be described, the thrust load is taken on the body of oil in the fluid chamber 37, causing relative movement between the clutch elements while obviating friction and consequent wear and noise.

The rearward extremity of the hub 32 is preferably formed with a spline fitting 40 for connection with the driving shaft of the transmission case, in a manner well known to those well skilled in the art. Normally, the clutch element 24 is held in frictional engagement with the flywheel or clutch element 27 by suitable compression springs 41, there being three such springs in the illustrated embodiment, each disposed in a recess 42 in the web 30. Said springs 41 are compressed between the bottoms of their respective recesses 42 and wing nuts 43 which are adjustable on the ends of studs 44, projecting rearwardly through the web 30 and carried by a spider 45 or the like. The spider 45 is rotatable on the crankshaft extension 23 and is held against axial movement by lock nuts 46 and a thrust washer 47.

In order to supply fluid under pressure to the chamber 37, whereby to effect disengagement of the clutch, the crankshaft extension 23 is provided with a central longitudinal bore 50 and an intersecting transverse bore 51 which is in constant communication with an annular groove 52 in the bearing sleeve 21—a. A conduit 53 has one end anchored as at 54 in the crankcase bearing boss, and extends laterally through the side of the crankcase (see Fig. 2) to be accessible for connection to the master cylinder 19, as will hereinafter be described.

While various types of master cylinders may be employed, I may prefer to make use of one as illustrated in Fig. 4. Such a master cylinder 19 comprises a tubular body 55, preferably made as a casting, having a smooth, cylindrical bore 56, within which is fitted a plunger or piston 57, capable of reciprocation. The outer or upper end of the plunger is of a reduced diameter to provide a piston rod 58 which slides through a packing gland 59 and a stop ring 59—a, a tight joint being maintained by means of packing 60, and said rod 58 carries at its outer extremity a pedal member 61 covered by a rubber pad 62. The pedal member 61 may be connected in any suitable manner to the rod 58, such as by a screw-threaded shank 63 engaging in a tapped hole in the end of piston rod 58. The cylinder 19 is preferably disposed at an inclination in the vertical plane as shown in Figs. 4 and 6, the degree of inclination being dependent upon the particular installation, and in order to adjust the same longitudinally, the outer surface of the body portion 55 is screw-threaded as at 64 for cooperative engagement with the threaded interior of a supporting bracket 65. Said supporting bracket 65 may conveniently be formed as a part of the steering gear housing, if desired, or it may be entirely separate and secured to the side rail or other fixed part of the chassis frame 1.

The lower end of the cylinder body 55 has a slightly smaller internal diameter, and this operative portion of the cylinder is filled with oil or other fluid capable of transmitting pressure. The oil may be fed by gravity from a suitable reservoir mounted above the cylinder, or it may be supplied through a tube 67 from the pressure lubricating system of the motor 8, as illustrated. The tube 67 communicates with the cylinder bore 56 adjacent the lower end of the plunger 57, when the latter is in its normal position of rest at the upper end of the cylinder, and is fitted with a coupling 68 for connection to a nipple 69 in the body 55. The nipple 69 has a restricted central longitudinal orifice 70 through which oil may flow inwardly to a port 71, which intersects an annular groove 72 in the wall of the cylinder bore 56. The arrangement of the parts is such that when the plunger 57 is in its normal position, as shown in Fig. 4, its lower end uncovers the port 71 and groove 72, permitting free circulation of oil from the conduit 67 to the cylinder bore 56, but when the plunger is moved downwardly by depression of the pedal 61, communication between the port 71 and the cylinder bore 56 is cut off. By virtue of the fact that the orifice 70 is restricted, only a small quantity of oil will pass through it without building up any substantial pressure in the cylinder, and without interfering with the venting of air from the system. The port 71 is in a boss which extends radially from the cylinder body 55 and which is fitted with another nipple 73 to which a tube 74 is connected, said tube 74 constituting a return line to the engine crankcase. From this it will be clear that the plunger 57 acts as a cut-off valve for the port 71, obviating the necessity of a check valve in the oil supply line 67, and when the port is so cut off, the oil is free to circulate from the conduit 67 to the conduit 74, whence it is returned to the pressure lubricating system. The lower end of the cylinder 19 is provided with a closure cap 75 in which the other end of the conduit 53 is secured by means of a suitable coupling nut 76.

As has previously been stated, the normal position of the plunger 57 is shown in Fig. 4, from which it will be seen that the return conduit is in free communication with the cylinder bore 56, permitting circulation of oil, and maintaining a full supply thereof in the cylinder, and by virtue of the fact that the port 71 is at the uppermost part of the fluid chamber, it is clear that any air in the system will work its way upward and pass into the crankcase. In order to disengage the clutch, it is only necessary to step upon the pedal members 61 and 62, moving the plunger 57 downwardly in the cylinder bore 56 against the fluid trapped therein, whereby pressure will be imposed on the fluid and transmitted through the conduit 53, annular groove 52 and bores 51 and 60 to the fluid chamber 37. Such pressure within the chamber 37 acts against the cylinder end wall 36, causing the same to move longitudinally rearward. The sleeve 32 and clutch member 24 move with the cylinder 34 against the action of the springs 41, causing the leather lined periphery of the member 24 to become disengaged from the recess 26 in the flywheel. When the foot pressure is released from the pedal, the springs 41 restore the clutch member 24 to its normal position, accompanied by return of the displaced oil to the cylinder bore 56 and consequent restoration of the plunger 57 to its normal position.

In Figs. 7 and 8, another form of master cylinder is shown, wherein the oil supply pipe 67 and oil return pipe 74 are connected at different points longitudinally in the cylinder. An annular groove 72—a and port 71—a are located adjacent the position of rest of the lower end of the plunger 57, as previously described, and another annular groove 76 and port 77 are spaced therefrom substantially at the lower end of the working portion 56—a of the cylinder. A nipple 69—a is threaded into the cylinder to communicate with the port 77, providing a connection for the oil supply pipe 67, and said nipple is provided at its outer end with a restricted orifice 78 through which the oil may flow inwardly. A spring-pressed check valve 79 is seated within the nipple 69—a and against the end of the orifice 78, and by this arrangement, the oil is free to flow inwardly when the plunger is at rest at the upper end of the cylinder, but will be cut off by oil pressure as the plunger is moved downwardly. Otherwise, the operation of the device is the same as in the first disclosed form. In each of these cylinders it is preferable to have the parts so proportioned that the packing gland 59 will be higher than the normal oil level indicated in Fig. 7.

It is not necessary to have both the pipes 67 and 74 communicating with the cylinder 56 at the same point as in Fig. 4, and in this respect another modification is shown in Fig. 9. Here the oil supply pipe 67 is connected by a coupling nut 68 and nipple 69 to the lower side of the cylinder body 55 in diametrical opposition to the outlet port 71. This arrangement permits freer venting of the system through the port 71 without possibility of hindrance from the oil coming in through the pipe 67. Under normal conditions of operation the plunger in Figs. 4 and 9 will not return to their extreme upper positions to uncover the annular groove 72, and therefore, it will be necessary to occasionally draw the pedal outwardly to such extreme position in order to replenish the oil in the system. If desired, a spring can be employed to positively return the plunger the full distance after each operation, but such spring is not really necessary. In that form of the invention shown in Figs. 7 and 8, of course, the circulating oil from the pipe 67 maintains sufficient pressure to uncover the outlet port 71—a.

From the foregoing it will be evident that an improved clutch and actuating means therefor have been provided, wherein the clutch is controlled hydraulically and free from wearing parts. The construction is extremely simple, capable of economical manufacture, and constitutes a substantial advance in the art. The improved master cylinders are not restricted to use with hydraulic clutches, but may also be employed with equal advantage in fluid pressure braking systems for vehicles. Obviously, the invention is susceptible of numerous further modifications in the details of construction and arrangement of parts, and the right is herein reserved to make such changes as fall within the scope of the appended claims without departing from the spirit of the invention.

This application is a re-filing of my application Serial No. 264,765, filed March 26, 1928, in which application the invention was first disclosed to the Patent Office.

Having thus described my invention, what I claim is:

1. In a clutch for automotive vehicles, a rotatable driving element, a driven element coaxial therewith adapted for frictional engagement with said driving element and adapted to be moved longitudinally with reference to the driving element, means for normally maintaining said driving and driven members in engagement with each other, substantially central fluid pressure means for moving said driven member out of engagement with the driving member by direct application of fluid pressure, and manumotive means for controlling the pressure in said fluid pressure means.

2. In a clutch for automotive vehicles, a rotatable driving element, a driven element coaxial therewith and movable into and out of frictional engagement with the driving element, said driving and driven elements being respectively connected to axially alined telescoped shafts, spring means for normally maintaining said frictional engagement between the parts, the opposing ends of the telescoped shafts providing fluid pressure means for moving the driven member out of such frictional engagement.

3. In a clutch, a rotatable driving element, a driven element coaxial therewith and movable into and out of frictional engagement with the driving element, said driving and driven elements being respectively connected to axially alined shafts, spring means for normally maintaining said frictional engagement between the parts, and actuating means including a fluid pressure cylinder of relatively small diameter rotatable with one of said clutch elements and having a snug sliding fit over the shaft of the other clutch element, the end of the last-mentioned shaft functioning as a piston within said cylinder.

4. In a clutch, a rotatable driving element, a driven element coaxial therewith and movable into and out of frictional engagement with the driving element, spring means for normally maintaining said frictional engagement between the parts, actuating means including a substantially central fluid pressure cylinder rotatable with one of said clutch elements, and a cooperating piston carried by the other clutch element.

5. In a clutch, a rotatable driving element, a driven element coaxial therewith and movable into and out of frictional engagement with the driving element, spring means for normally maintaining said frictional engagement between the parts, actuating means including a substantially central fluid pressure cylinder rotatable with one of said clutch elements, a cooperating piston carried by the other clutch element, and means for supplying fluid under pressure to said cylinder during rotation of the parts, whereby to control said actuating means.

6. In combination, clutch elements normally held resiliently in operative surface engagement with each other, a fluid pressure cylinder fixed with reference to one of the clutch elements and free from communication with the operative engaging surface, a piston operable in said cylinder and fixed with reference to the other clutch element, and means for supplying fluid under pressure to said cylinder whereby to disengage the clutch elements.

7. In combination, clutch elements normally held resiliently in frictional surface engagement with each other, a fluid pressure cylinder fixed with reference to one of the clutch elements and free from communication with the operative engaging surface, a piston operable in said cylinder and fixed with reference to the other clutch element, and means for supplying fluid under pressure through said piston to the interior of said cylinder, whereby to disengage the clutch elements.

8. In combination, with a driving shaft and a driven shaft in axial alinement, a clutch member secured to the driving shaft for rotation therewith in a fixed plane, a cooperating clutch member rotatable with the driven shaft and movable axially thereon whereby to be capable of selective engagement with and disengagement from the first clutch member, a pressure cylinder carried by the axially movable clutch member and snugly fitting over the adjacent end of the driving shaft, and means for supplying fluid under pressure through the driving shaft to the interior of the cylinder, whereby to effect the relative axial movement.

9. In combination, a driving shaft, a driven shaft, clutch elements secured to driving and driven shafts respectively and normally in operative engagement with each other, and hydraulic means for disengaging said clutch elements, the thrust load being taken on a body of oil which causes relative movement between the clutch elements, said body of oil being centrally located within one of the shafts.

10. In combination a driving shaft, a driven shaft, clutch elements secured to driving and driven shafts respectively and normally in operative engagement with each other, and hydraulic means for disengaging said clutch elements, the thrust load being taken on a body of oil which causes relative movement between the clutch elements, said body of oil being centrally located in relation to the axis of the driving shaft and confined within the driven shaft.

11. Power transmission means comprising, in combination, an engine crank shaft journalled in a plurality of bearings and constituting a driving shaft, a driven shaft independently journalled but having one end piloted with reference to one end of the crank shaft, friction clutch elements respectively secured to the crank shaft and the driven shaft, said clutch elements being adapted to be selectively engaged and disengaged with reference to each other, and manually operated fluid-pressure means effective between the piloted ends of said shafts to control engagement and disengagement of the clutch elements.

12. Power transmission means comprising, in combination, an engine crank shaft journalled in a plurality of bearings and constituting a driving shaft, a driven shaft independently journalled but having one end piloted with reference to one end of the crank shaft, friction clutch elements respectively secured to the crank shaft and the driven shaft, said clutch elements being adapted to be selectively engaged and disengaged with reference to each other, and manually operated fluid-pressure means effective between the piloted ends of said shafts to control engagement and disengagement of the clutch elements, and means for supplying pressure fluid to said control means through one of the crank shaft bearings and the adjacent portion of the shaft.

13. Power transmission means comprising in combination, an engine crank shaft journalled in a plurality of bearings, a co-axial driven shaft independently journalled for rotation and axial movement with reference to the crank shaft, the end of one of said shafts being piloted within the other and leaving therein a pressure chamber, a fly-wheel secured to the crank shaft, a friction clutch element cooperatively disposed within the fly-wheel and secured to the driven shaft, and means for supplying pressure fluid to said pressure chamber through the end bearing and adjacent part of the crank shaft whereby to control engagement and disengagement of said clutch element.

14. In a motor vehicle or the like, in combination with the motor unit having an end bearing, a power shaft journalled therein and a variable speed transmission unit having a transmission shaft in axial alinement with said power shaft, a clutch providing a disengageable driving connection between said power shaft and transmission shaft, and means for conducting the actuating pressure fluid to and from said clutch through the end bearing of the motor and the center of the adjacent portion of the power shaft.

15. In a motor vehicle or the like, in combination with the motor unit having an end bearing, a power shaft journalled therein and a variable speed transmission unit having a transmission shaft in axial alinement with said power shaft, a clutch providing a disengageable driving connection between said power shaft and transmission shaft, said clutch having relative movable clutch elements and a central body of oil for taking the thrust load and causing the relative movement of said clutch elements, oil-conducting means through the end bearing of the motor and in the power shaft to said central body of oil, and means adjacent a driver's seat for controlling pressure of oil in said oil-conducting means whereby to control the engagement and disengagement of the clutch.

16. In combination, clutch elements normally in operative engagement with each other, a driving shaft to which one of the clutch elements is secured, a driven shaft to which the other clutch element is secured, the said shafts having telescoping engagement with each other and being relatively movable axially, an oil chamber between the telescoped ends of the shafts, said oil chamber communicating with a bore in the driving shaft, a bearing for the driving shaft having a chamber therein communicating with the bore in the driving shaft, the chambers and the bore being normally filled with oil, and means for creating pressure on the oil to move said shafts relatively for disengagement of the clutch elements.

17. In combination, an engine having a crank shaft, a driven shaft, clutch elements connected respectively with the crank and driven shafts, said clutch elements normally held resiliently in operative surface engagement with each other, a fluid pressure cylinder fixed with reference to one of the clutch elements and free from communication with the operative engaging surface, a piston operable in said cylinder and fixed relative to the other clutch element and means for supplying fluid under pressure to said cylinder through the crank shaft to disengage the clutch elements.

18. In combination an engine having a crank shaft, a bearing for the crank shaft, a driven shaft, clutch elements connected respectively with the crank and driven shafts, said clutch elements normally held resiliently in operative surface engagement with each other, a fluid pressure cylinder fixed with reference to one of the clutch elements and free from communication with the operative engaging surface, a piston operable in said cylinder and fixed relative to the other clutch element and means for supplying fluid under pressure to said cylinder through the crank shaft bearing to disengage the clutch elements.

19. In combination an engine having a crank shaft, a rear bearing for the crank shaft, a driven shaft, clutch elements connected respectively with the crank and driven shafts, said clutch elements normally held resiliently in operative surface engagement with each other, a fluid pressure cylinder fixed with reference to one of the clutch elements and free from communication with the operative engaging surface, a piston operable in said cylinder and fixed relative to the other clutch element and means for supplying fluid under pressure to said cylinder through the rear crank shaft bearing to disengage the clutch elements.

HUGH M. ROCKWELL.